(12) United States Patent
Mason et al.

(10) Patent No.: US 8,955,915 B2
(45) Date of Patent: Feb. 17, 2015

(54) CHILD SAFETY SEAT HAVING AN ADJUSTABLE CROTCH STRAP

(71) Applicant: BP Children's Products HK Co., Limited, Kwun Tong, Kowloon (HK)

(72) Inventors: Kyle S. Mason, Reading, PA (US); James M. F. Hutchinson, Mohnton, PA (US)

(73) Assignee: BP Children's Products HK Co., Limited, Hong Kong (HK)

( * ) Notice: Subject to any disclaimer, the term of this patent is extended or adjusted under 35 U.S.C. 154(b) by 104 days.

(21) Appl. No.: 13/654,534

(22) Filed: Oct. 18, 2012

(65) Prior Publication Data

US 2013/0099536 A1    Apr. 25, 2013

Related U.S. Application Data

(60) Provisional application No. 61/627,980, filed on Oct. 21, 2011.

(51) Int. Cl.
| | | |
|---|---|---|
| *B60N 2/42* | (2006.01) | |
| *A47C 1/08* | (2006.01) | |
| *A47D 15/00* | (2006.01) | |
| *B60N 2/28* | (2006.01) | |

(52) U.S. Cl.
CPC .................................. *B60N 2/2812* (2013.01)
USPC .................... 297/467; 297/250.1; 297/216.11

(58) Field of Classification Search
CPC ...... A47D 15/006; B60N 2/26; B60N 2/2812; B60N 2/2842; B60R 22/20; B60R 22/105
USPC ............ 297/184.13, 216.11, 219.12, 256.16, 297/256.17, 250.1, 467, 468
See application file for complete search history.

(56) References Cited

U.S. PATENT DOCUMENTS

| | | | |
|---|---|---|---|
| 3,031,229 A | 4/1962 | Symbaluk | |
| 6,543,847 B2 * | 4/2003 | Balensiefer | 297/250.1 |
| 6,588,849 B2 * | 7/2003 | Glover et al. | 297/467 |
| 7,861,341 B2 * | 1/2011 | Ayette et al. | 5/621 |
| 8,517,467 B2 * | 8/2013 | Fritz et al. | 297/250.1 |
| 2002/0036423 A1 | 3/2002 | Glover et al. | |
| 2002/0109391 A1 * | 8/2002 | Shie | 297/467 |
| 2007/0228788 A1 * | 10/2007 | Meeker et al. | 297/250.1 |
| 2007/0228802 A1 * | 10/2007 | Nakhla | 297/469 |
| 2008/0168603 A1 * | 7/2008 | Ayette et al. | 5/628 |
| 2009/0127902 A1 * | 5/2009 | Meeker et al. | 297/250.1 |
| 2011/0056022 A1 * | 3/2011 | Ayette et al. | 5/621 |

FOREIGN PATENT DOCUMENTS

| | | |
|---|---|---|
| CN | 101224717 A | 7/2008 |
| CN | 201124806 Y | 10/2008 |
| JP | 2005169004 A | 6/2005 |

* cited by examiner

Primary Examiner — Ryan Kwiecinski
(74) Attorney, Agent, or Firm — David I. Roche; Baker & McKenzie LLP

(57) ABSTRACT

A child safety seat includes a seat shell having an opening, a crotch strap and a fixture. The crotch strap has a first end portion, a second end portion, and an intermediate portion between the first and second end portions. The first end portion is anchored with the seat shell, the second end portion extends outward through the opening, and the intermediate portion is adjustable relative to the seat shell between a first and a second position spaced apart from each other. The fixture is operable to hold the intermediate portion of the crotch strap at any of the first and second positions.

19 Claims, 16 Drawing Sheets

CHILD SAFETY SEAT HAVING AN ADJUSTABLE CROTCH STRAP

CROSS-REFERENCE TO RELATED APPLICATION

This application claims priority to U.S. Provisional Patent Application No. 61/627,980, which was filed on Oct. 21, 2011.

BACKGROUND

1. Field of the Invention

The present inventions relate to child restraint harnesses used in child seats, in particular child safety seats.

2. Description of the Related Art

Child safety seats generally include an internal child restraint harness. The child restraint harness includes a crotch strap provided with a buckle, and shoulder and waist straps that can engage with the buckle so that the fastened harness can restrain the child. In order to provide more flexibility in use, some child restraint harness may have a crotch strap that is adjustable relative to the seat to accommodate children of different sizes. However, the conventional construction of the adjustable crotch strap may require the caregiver to partially disassemble and adjust the position of the anchor point where the crotch strap is attached with the child seat. This may lead to incorrect assembly or weaken the attachment of the crotch strap with the child seat, which can inhibit the ability of the restraint harness to safely hold the child when a collision occurs.

Therefore, there is a need for a child safety seat that can have an adjustable crotch strap for accommodating children of different sizes, and address at least the foregoing issues.

SUMMARY

The present application describes child safety seats having a restraint harness that can accommodate children of different sizes, and can be safer in use. In some embodiments, the child safety seat includes a seat shell having an opening, a crotch strap and a fixture. The crotch strap has a first end portion, a second end portion, and an intermediate portion between the first and second end portions. The first end portion is anchored with the seat shell, the second end portion extends outward through the opening, and the intermediate portion is adjustable relative to the seat shell between a first and a second position spaced apart from each other. The fixture is operable to hold the intermediate portion of the crotch strap at any of the first and second positions.

In other embodiments, the child safety seat includes a seat shell having an opening and a crotch strap, and a bracket movably assembled with the seat shell. The crotch strap has a first end portion, a second end portion, and an intermediate portion between the first and second end portions, the first end portion being anchored with the seat shell, the second end portion extending freely outward through the opening, and the intermediate portion being adjustable relative to the seat shell between a first and a second position spaced apart from each other. The bracket is operable to hold the intermediate portion of the crotch strap at any of the first and second positions.

In some variant embodiments, the child safety seat includes a seat shell having an opening, an anchor frame affixed with the seat shell adjacent to the opening, and a crotch strap having a first end portion and a second end portion, the first end portion forming a loop that wraps around the anchor frame, and the second end portion extending outward through the opening, the loop being movable along the anchor frame to adjust the first end portion between multiple positions spaced apart from each other.

DETAILED DESCRIPTION OF THE EMBODIMENTS

Figure 1:
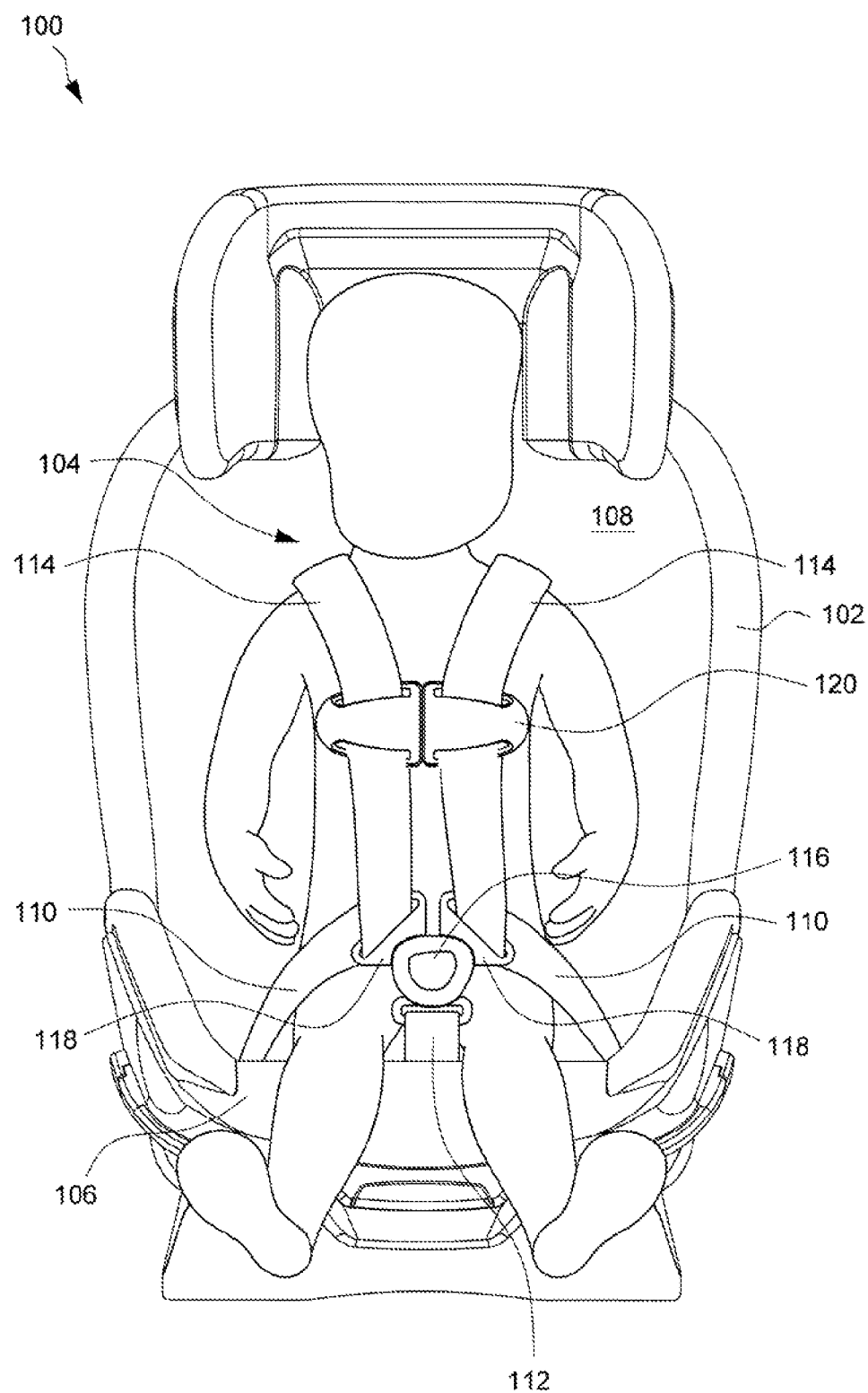
FIG. 1 is a schematic view illustrating an embodiment of a child safety seat.

FIG. 1 is a schematic view illustrating an embodiment of a child safety seat 100. The child safety seat 100 can be typically used to seat a child in a vehicle. The child safety seat 100 can include a seat shell 102, and a restraint harness 104 assembled with the seat shell 102. The seat shell 102 can have a seat portion 106 and a seatback 108. In some embodiments, the seat shell 102 can be formed by plastic molding.

The restraint harness 104 can include waist straps 110, a crotch strap 112, shoulder straps 114, and a fastening buckle 116 held with the crotch strap 112. In one embodiment, the restraint harness 104 can implement a three-point attachment including two fasteners 118 operable to engage and lock with the buckle 116. The two fasteners 118 can include a left fastener 118 connected with the left waist strap 110 and the left shoulder strap 114, and a right fastener 118 connected with the right waist strap 110 and the right shoulder strap 114. In one embodiment, the left waist strap 110 and the left shoulder strap 114 can be formed from a same continuous web material that is routed through the left fastener 118, and the right waist strap 110 and the right shoulder strap 114 can be formed from another continuous web material that is routed through the right fastener 118. Each of the fasteners 118 can include a tongue portion adapted to engage through the buckle 116. In addition, the restraint harness 100 can include a chest clip device 120 operable to properly position the left and right shoulder straps 114.

Figure 2:
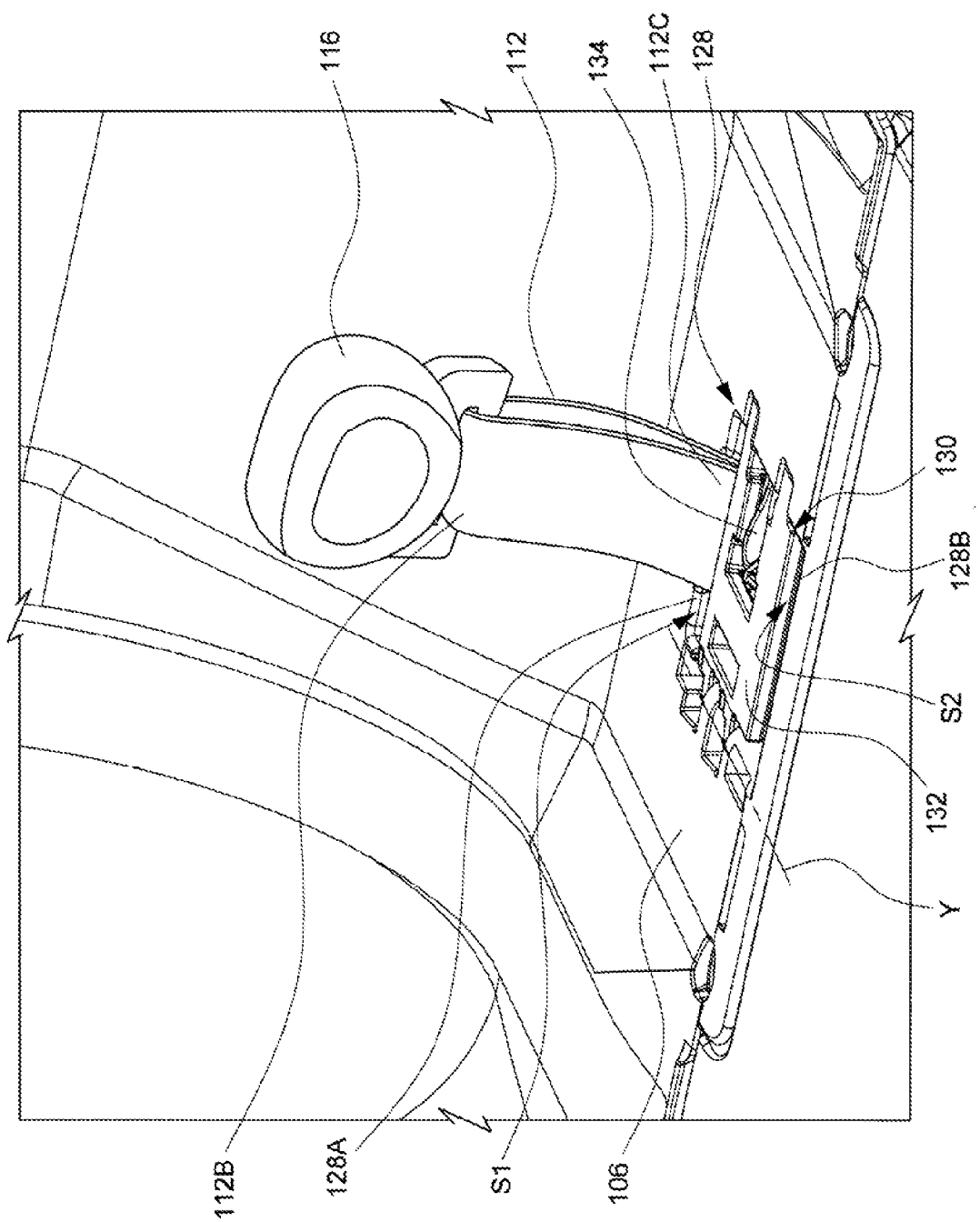
FIG. 2 is an enlarged view illustrating a region of a seat portion including the crotch strap.
Figure 3:
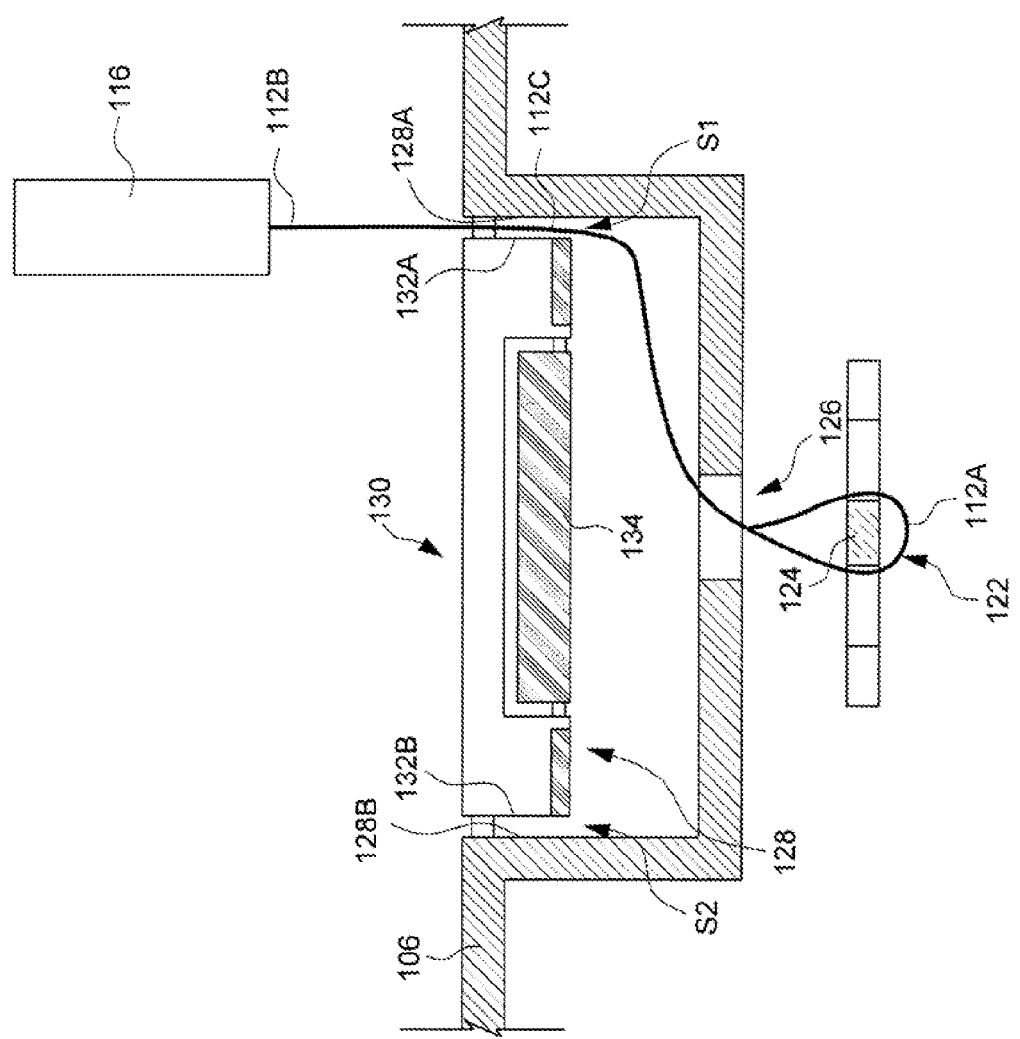
FIG. 3 is a cross-sectional view illustrating the assembly of the crotch strap in the embodiment shown in FIG. 2.

In conjunction with FIG. 1, FIG. 2 is an enlarged view illustrating a region of the seat portion 106 including the crotch strap 112, and FIG. 3 is a cross-sectional view illustrating the assembly of the crotch strap 112. The crotch strap 112 can be disposed adjacent to a front of the seat portion 106. In order to accommodate different sizes of children, the crotch strap 112 can be adjustable along a lengthwise axis extending from the rear toward the front of the seat shell 102. The crotch strap 112 can be made of a webbing material having a first end portion 112A, a second end portion 112B, and an intermediate portion 112C between the first and second end portions 112A and 112B.

The first end portion 112A is securely anchored with the seat shell 102. In one embodiment, the first end portion 112A can form a loop 122 that can wrap around a bar 124 affixed with the seat shell 102. A pivotal connection can be thereby realized allowing the crotch strap 112 to pivot relative to the seat shell 102 about the bar 124. From the first end portion 112A, the crotch strap 112 then can be routed through an inner slot 126 provided in the seat shell 102, and then extend outward via an opening 128 formed on an outer surface of seat portion 106. The second end portion 112B can extend freely outward from the opening 128, and can be assembled with the buckle 116.

The crotch strap 112 may be adjusted back and forth through the opening 128 to accommodate children of different sizes. For example, when the child has a smaller body, the crotch strap 112 can be adjusted rearward to a first position where the intermediate portion 112C is located adjacent to a rear border region 128A of the opening 128. When the child has a larger size, the crotch strap 112 can be adjusted forward to a second position where the intermediate portion 112C is located adjacent to a front border region 128B of the opening 128 at a side opposite to the rear border region 128A.

Figure 4:
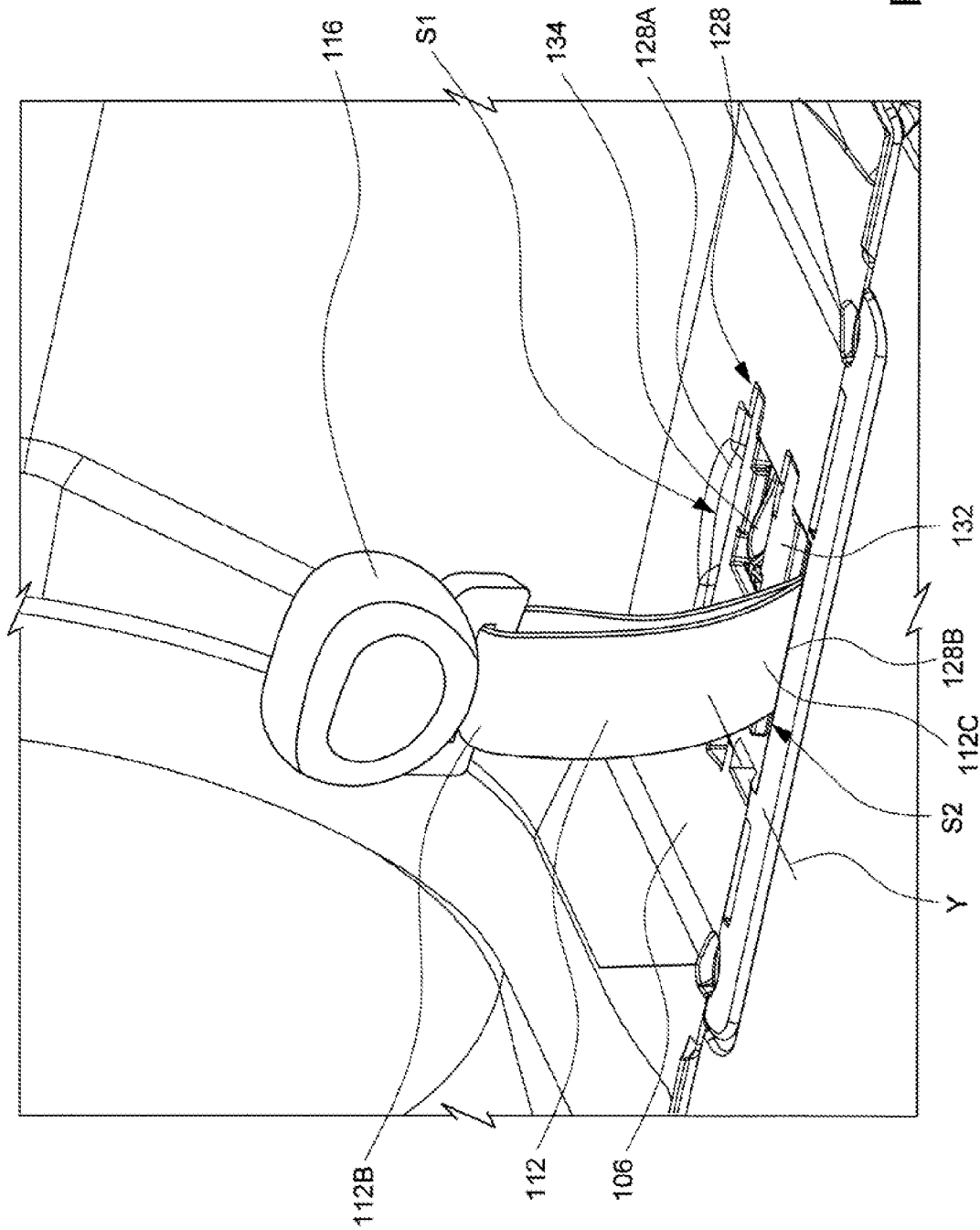
FIG. 4 is an enlarged view illustrating the crotch strap adjusted to another position in the child safety seat shown in FIG. 1.

A fixture 130 can be provided to hold the intermediate portion 112C at any of the aforementioned first and second positions. In one embodiment, the fixture 130 can include a bracket 132 that is movably assembled with the seat shell 102 at a location adjacent to the opening 128. For example, the bracket 132 can be pivotally connected with the seat shell 102 about an axis Y. The bracket 132 can rotate relative to the seat shell 102 between a locking position where the bracket 132 closes at least partially the opening 128, and an unlocking position where the bracket 132 uncovers the opening 128. The locking position of the bracket 132 can define two spaced-apart slits: a first slit S1 defined between the rear border region 128A of the opening 128 and a first side edge 132A of the bracket 132, and a second slit S2 defined between the front border region 128B of the opening 128 and a second side edge 132B of the bracket 132. The intermediate portion 112C can be held through the first slit S1 in the first position (as shown in FIG. 2), and through the second slit S2 in the second position (as shown in FIG. 4).

In some embodiments, the location where the first end portion 112A is securely anchored with the seat shell 102 (i.e., at the bar 124) can be arranged closer to the second slit S2 than the first slit S1. In this manner, the length of the crotch strap 112 extending outward can be shorter when it is in the first position passing through the first slit S1 than when it is the second position passing through the second slit S2. Accordingly, the adjustment of the position of the crotch strap 112 can also result in a change of the length of the crotch strap 112 extending outward to accommodate children of different sizes.

Referring to FIG. 2, a latch 134 can be provided to lock the bracket 132 with the seat shell 102. The latch 134 can be assembled with the bracket 132, and can be operable to engage with an edge of the opening 128 for holding the bracket 132 in the locking position.

Figure 5:
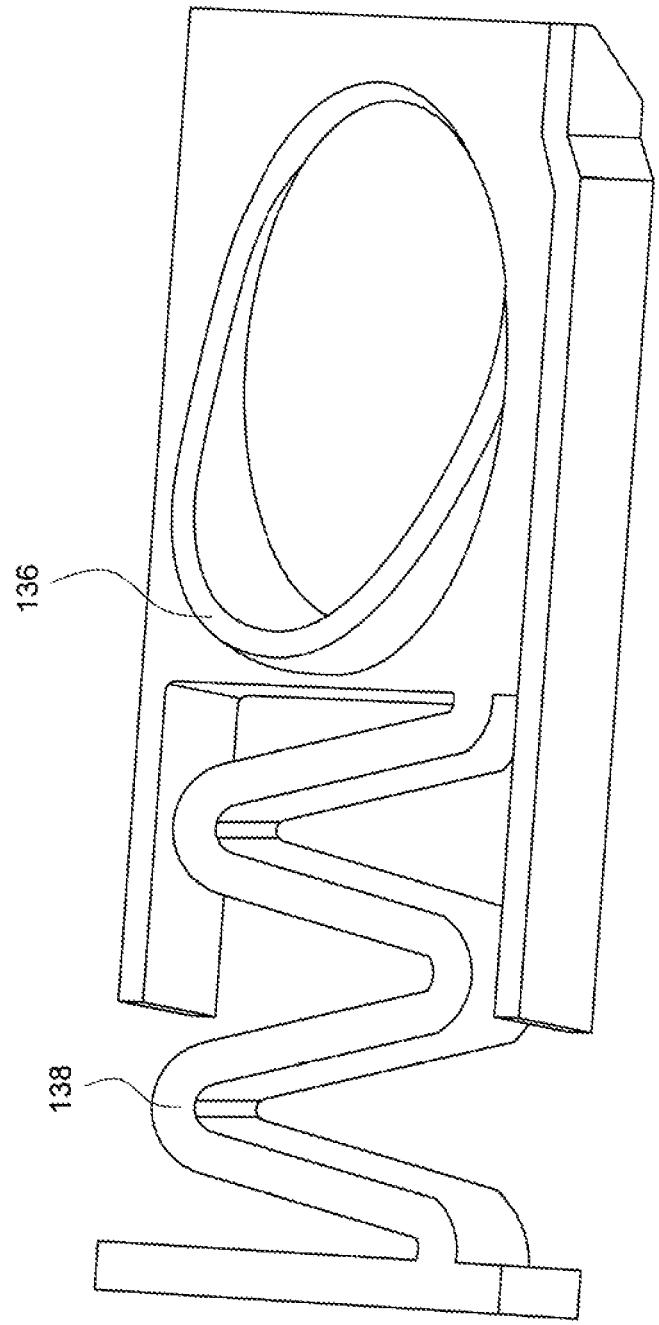
FIG. 5 is a schematic view illustrating an exemplary construction of a latch applied in a fixture configured to hold the crotch strap in place in the embodiment shown in FIG. 2.

FIG. 5 is a schematic view illustrating an exemplary construction of the latch 134. The latch 134 can include a rib 136 for facilitating unlocking operation. A spring 138 may also be provided to bias the latch 134 for engaging with the seat shell 102. In one embodiment, the spring 138 may be formed integral with latch 134.

Figure 6:
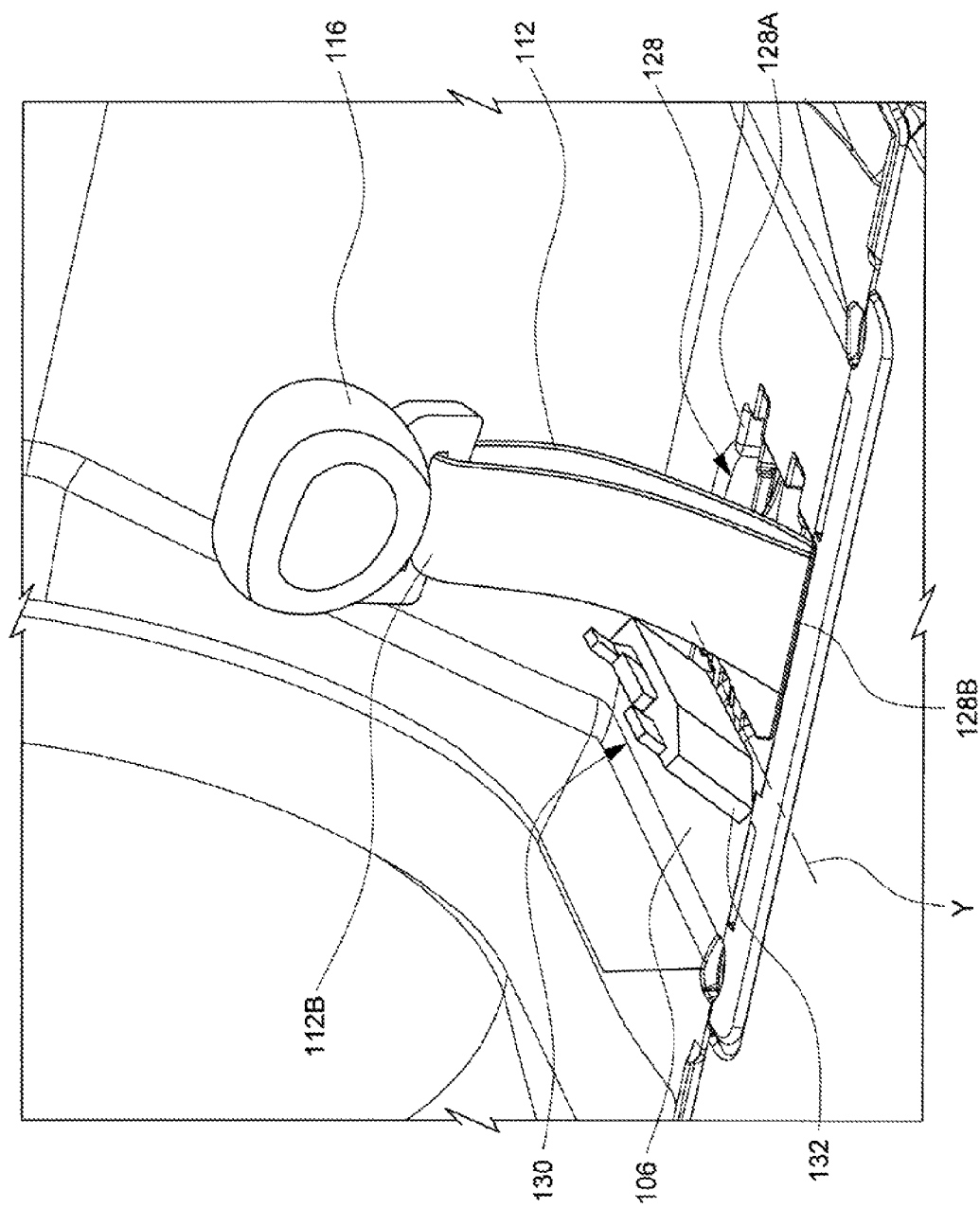
FIG. 6 is an enlarged view illustrating an unlocking state of the fixture shown in FIG. 2.

When the position of the crotch strap 112 needs to be changed, the latch 134 can be unlocked, and the bracket 132 can rotate to uncover the opening 128 as shown in FIG. 6. The crotch strap 112 then can be adjusted along the opening 128 so as to place the intermediate portion 112C at any of the first position adjacent to the rear border region 128A, and the second position adjacent to the front border region 128B. During adjustment of the crotch strap 112, the first end portion 112A can be retained with the affixed bar 124 at a fixed position. Once the crotch strap 112 is disposed at the desired position, the bracket 132 can be turned to the locking position covering the opening 128, and the latch 134 can engage with the seat shell 102 to hold the bracket 132 in the locking position. Accordingly, the intermediate portion 112C can be restrictedly held in the first position between the bracket 132 and the read border region 128A of the opening 128 for accommodating a child of a smaller size, or in the second position between the bracket 132 and the front border region 128B of the opening 128 for accommodating a child of a larger size.

It is worth noting that the fixture 130 described above may be designed to accommodate more than two positions of the crotch strap 112. For example, in alternate embodiments, the bracket 132 may also include a slot located between the edges 132A and 132B. When the bracket 132 is in the locking position, the intermediate portion 112C of the crotch strap 112 may be held in this slot at a third position between the aforementioned first and second positions.

Rather than a pivotal connection, the bracket 132 can also be slidably assembled with the seat shell 102. Instead of rotating movements, the bracket 132 can perform sliding displacements to cover and uncover the opening 128 like described previously.

Figure 7:
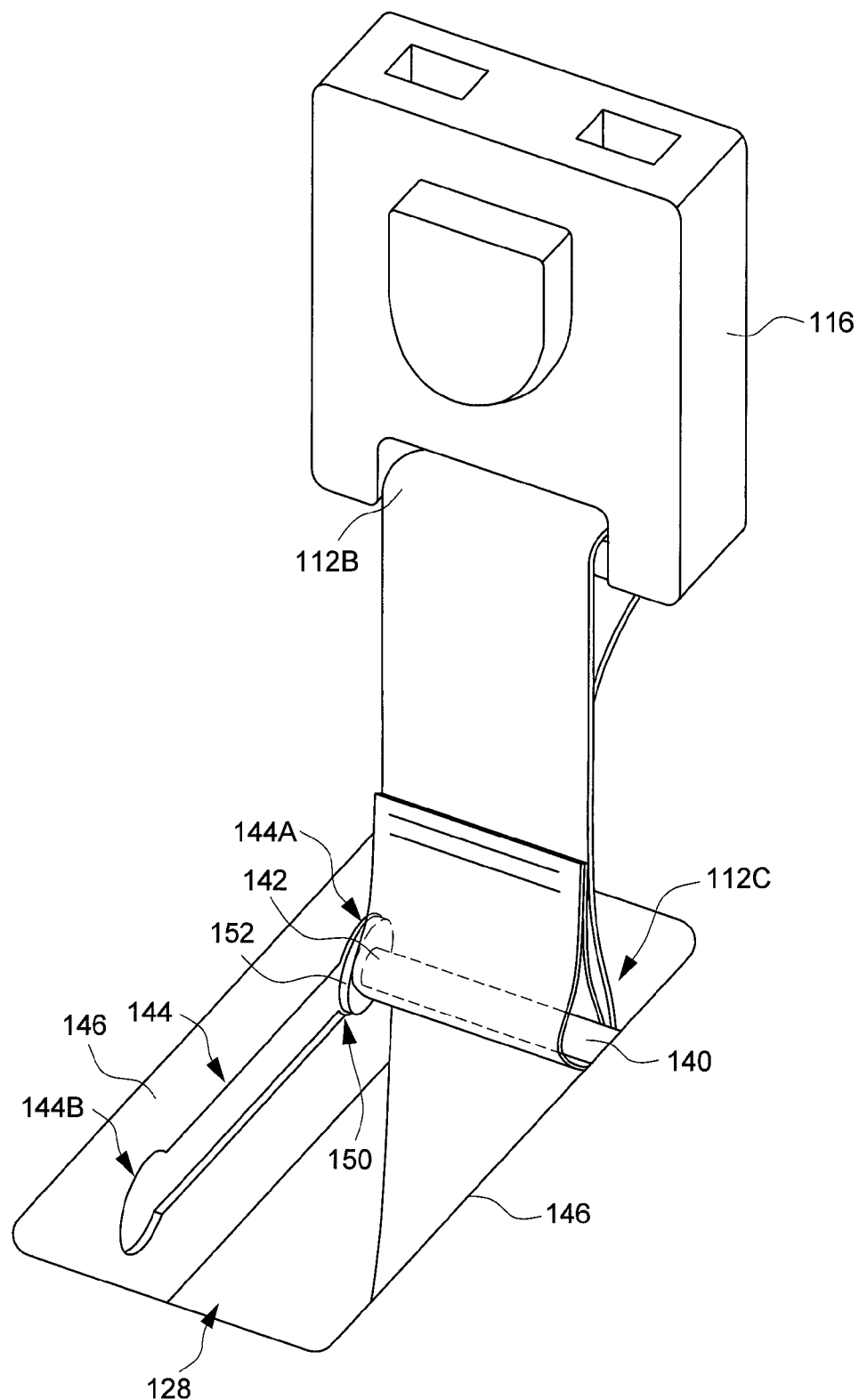
FIG. 7 is a perspective view illustrating another embodiment of assembling a crotch strap with a seat shell.
Figure 8:
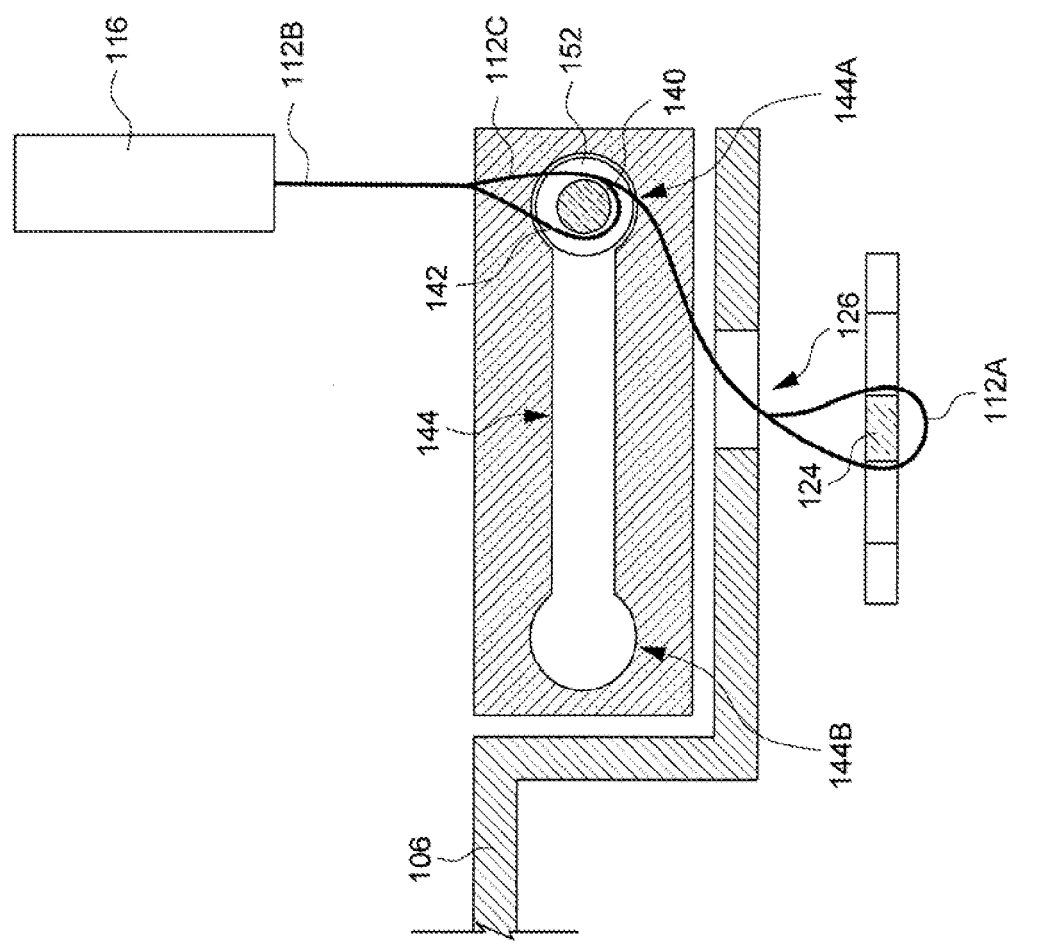
FIG. 8 is a cross-sectional view of the embodiment shown in FIG. 7.
Figure 9:
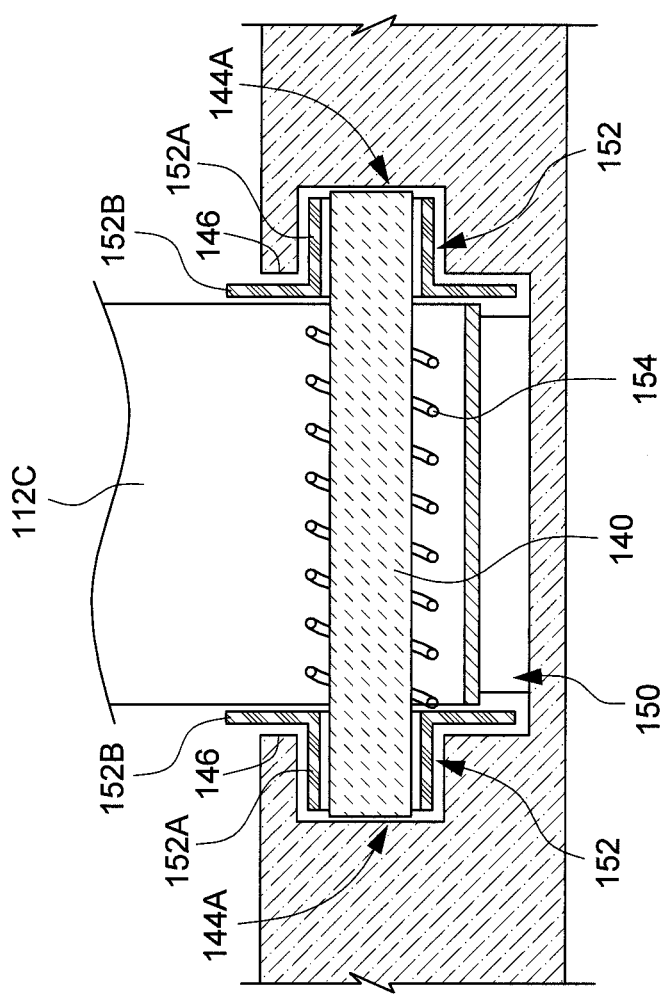
FIG. 9 is a cross-sectional view illustrating a fixture applied in the embodiment shown in FIG. 7.
Figure 10:
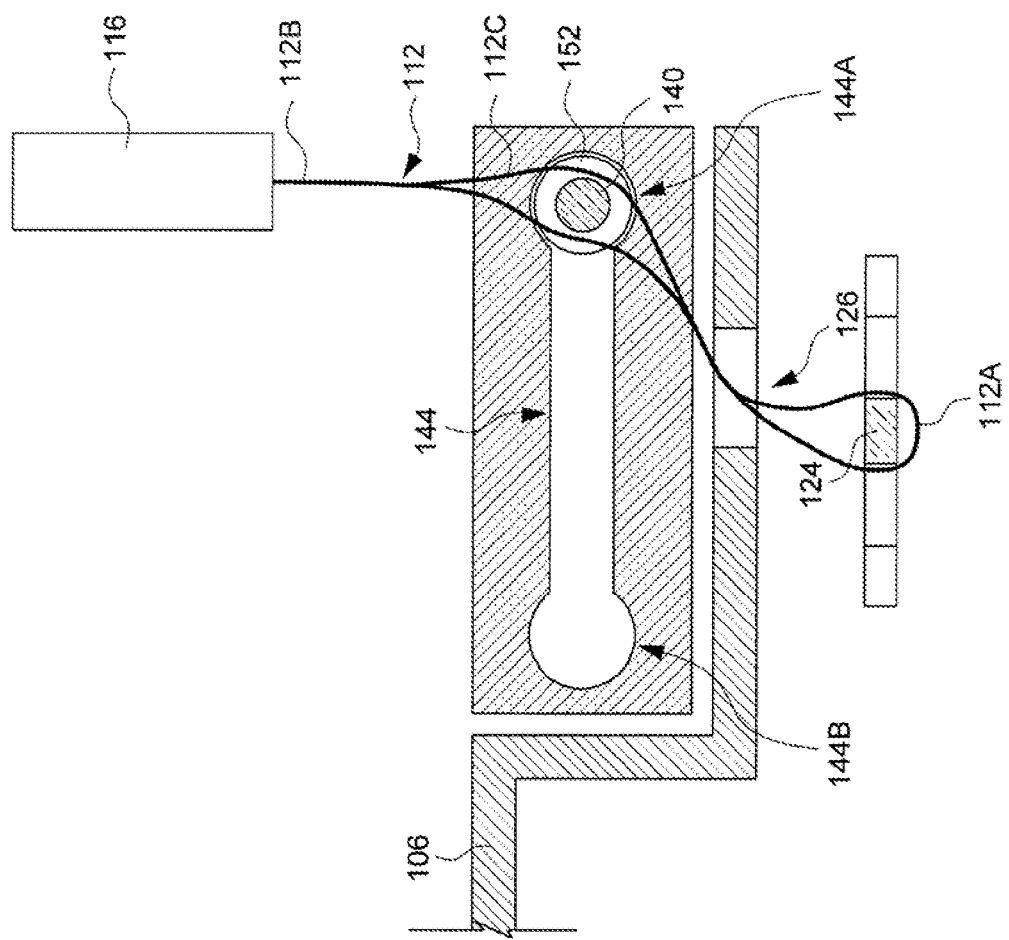
FIG. 10 is a schematic view illustrating a variant embodiment of movably assembling a crotch strap with the seat shell.

FIGS. 7-9 are schematic views illustrating another embodiment of assembling the crotch strap 112 with the seat portion 106 of the seat shell 102. The first end portion 112A of the crotch strap 112 can be anchored with the seat shell 102. The intermediate portion 112C of the crotch strap 112 can be assembled with a rod 140. In the embodiment shown in FIGS. 7-9, the intermediate portion 112C may exemplary include an extension 142 that forms a loop wrapping around the rod 140, such that the rod 140 can be held with the intermediate portion 112C. Other constructions, however, may be possible to assemble the rod 140 with the intermediate portion 112C of the crotch strap 112. For example, FIG. 10 is a schematic view illustrating a variant embodiment in which the webbing material of the crotch strap 112 can be sewn in a way so that the rod 140 is surrounded by the webbing material of the crotch strap 112.

Referring again to FIGS. 7-9, the rod 140 may have a length that is greater than a width of the crotch strap 112. Two opposite ends of the rod 140 can be respectively assembled through elongated slot structures 144 formed on two opposite sidewalls 146 of the opening 128. When the intermediate portion 112C is adjusted relative to the seat shell 102, the rod 140 can slide along the slot structures 144.

A fixture 150 can be provided to hold the intermediate portion 112C at the desired positions. The fixture 150 can include two latches 152 respectively assembled adjacent to the two ends of the rod 140. Each of the latches 152 may be formed with an integral shape having a locking end 152A, and a flange 152B for facilitating operation. More specifically, one embodiment may have the latches 152 formed with bushing shapes. The latches 152 can be operable to move along the rod 140 to engage with and disengage from the slot structures 144.

A spring 154 can be wrapped around the rod 140, and can be oppositely connected with the latches 152. The spring 154 can bias the latches 152 in opposite directions so as to engage with the slot structures 144.

Each of the slot structures 144 can include a plurality of enlarged sections 144A and 144B that are disposed at spaced-apart locations corresponding to the different positions which can be occupied by the intermediate portion 112C. Each of the enlarged sections can have a shape into which the locking end 152A of one associated latch 152 can engage to block displacement of the rod 140 and thereby hold the intermediate portion 112C at a desired position. Exemplary shapes for the enlarged sections can include, without limitation, circular shapes (as shown in FIGS. 7 and 8), slotted shapes, and the like. As shown, two enlarged sections 144A and 144B can be exemplary provided corresponding to rearward and forward positions of the crotch strap 112 like previously described.

When the crotch strap 112 is to be adjusted, a caregiver can push on the flanges 152B to cause the latches 152 to move toward each other and disengage from the enlarged sections (e.g., the enlarged sections 144A). Then the crotch strap 112 can be displaced along the lengthwise axis of the seat shell 102 until the intermediate portion 112C reaches a desired position. During adjustment of the crotch strap 112, the first end portion 112A can be retained with the affixed bar 124 at a fixed position. Once the desired position is reached, the spring 154 can urge the latches 152 to engage with the corresponding enlarged sections (e.g., the enlarged sections 144B) to hold the intermediate portion 112C at the desired position.

Figure 11:
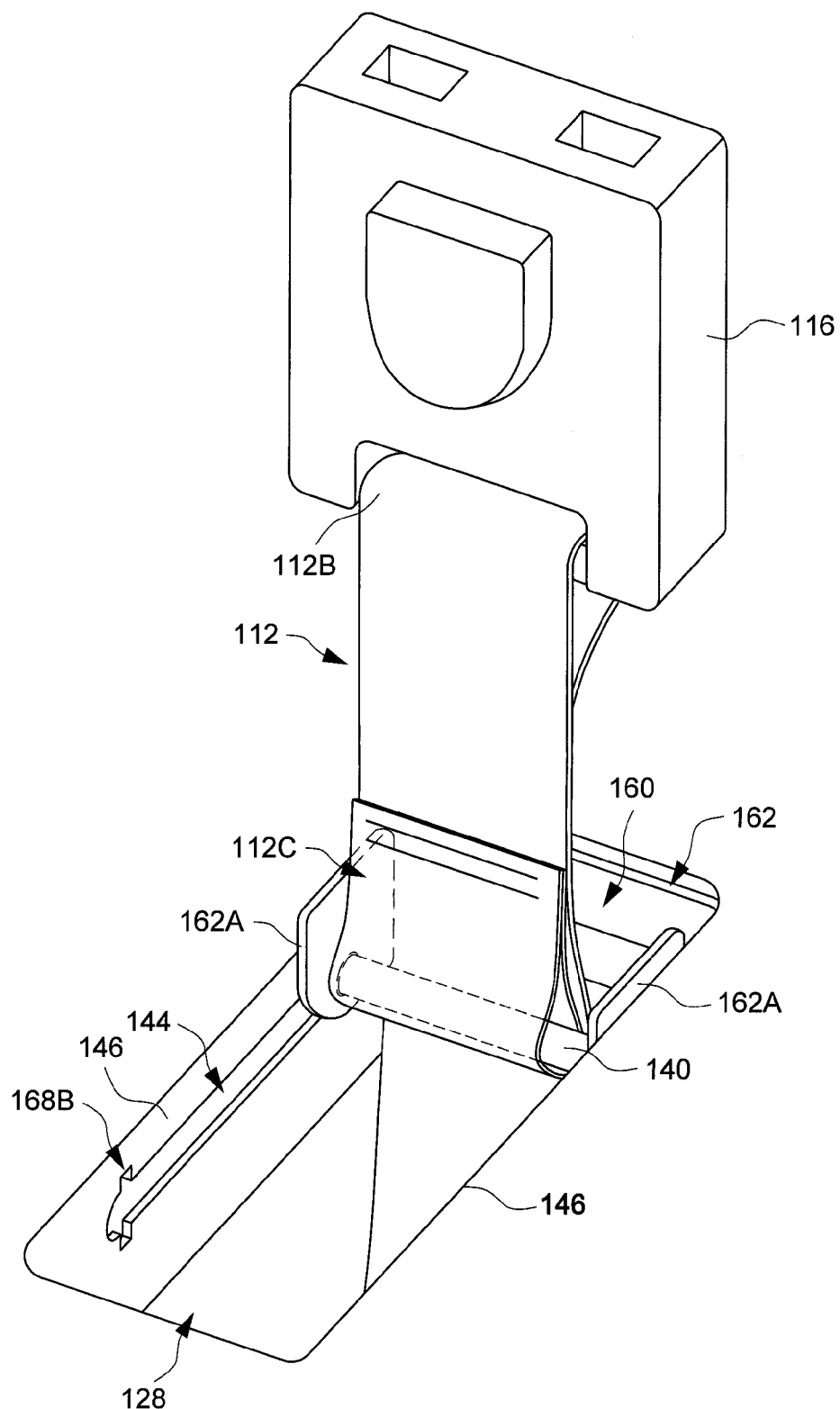
FIG. 11 is a perspective view illustrating another variant embodiment of assembling a crotch strap with a seat shell.
Figure 12:
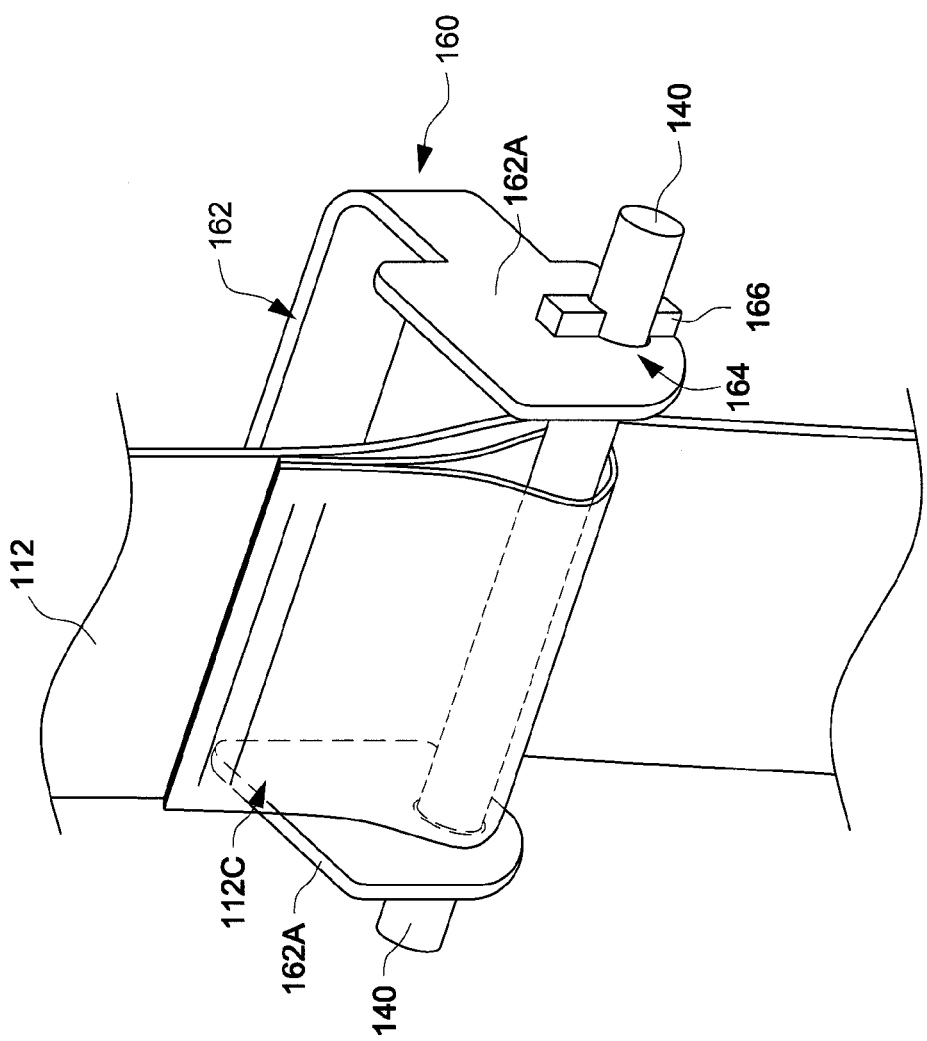
FIG. 12 is a perspective view illustrating a fixture applied in the embodiment shown in FIG. 11.
Figure 13:
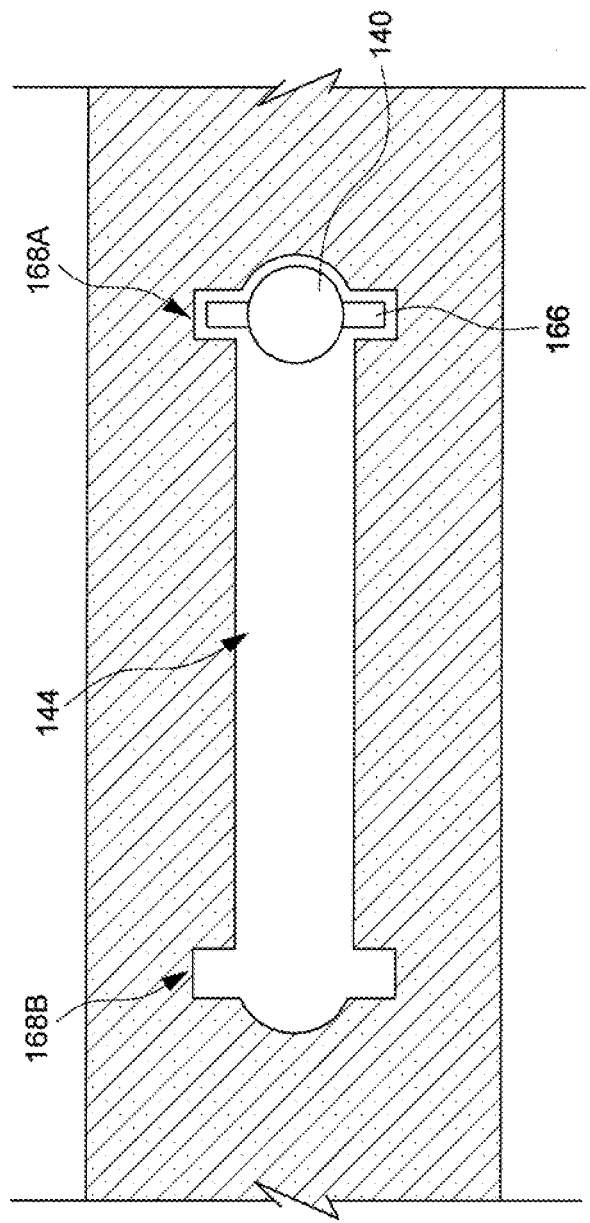
FIG. 13 is a cross-sectional view illustrating a slot structure provided in the seat shell for movably assembling the crotch strap in the embodiment shown in FIG. 11.

FIGS. 11-13 are schematic views illustrating another fixture 160 adapted to hold the intermediate portion 112C in place. The fixture 160 can include a U-shaped bracket 162 having two opposite arms 162A. Each arm 162A can have a hole 164, and an outer surface provided with a protrusion forming a latch 166. The bracket 162 comprised of the arms 162A and the latches 166 can be integrally formed in a unitary piece. The rod 140 affixed with the seat shell 102 can be assembled transversally through the holes 164 of the two arms 162A, and the first end portion 112A of the crotch strap 112 can wrap around the rod 140 between the two arms 162A.

The latch 166 can be disposed adjacent to a rim of the hole 164. The arms 162A of the bracket 162 can be elastically deflectable so as to cause the latches 166 to engage and disengage from the slot structures 144.

Each of the slot structures 144 can include a plurality of enlarged sections 168A and 168B through any of which the associated latch 166 can respectively engage to hold the intermediate portion 112C at a desired position. As shown, two enlarged sections 168A and 168B can be exemplary provided corresponding to rearward and forward positions of the crotch strap 112. However, more enlarged sections may be possible to provide more than two adjustable positions of the crotch strap 112.

When the crotch strap 112 is to be adjusted, the arms 162A can be pressed to deflect toward each other so as to respectively disengage the latches 166 from the enlarged sections 168B. The released crotch strap 112 then can be adjusted, which drives the rod 140 to slide along the slot structures 144. Once the rod 140 is located in alignment with one set of enlarged sections, e.g., the enlarged sections 168B as illustrated, the arms 162A of the bracket 162 can deflect outward to cause the latches 166 to respectively engage with the enlarged section 168B of the slot structures 144. The intermediate portion 112C of the crotch strap 112 can be thereby locked at the desired position.

Figure 14:
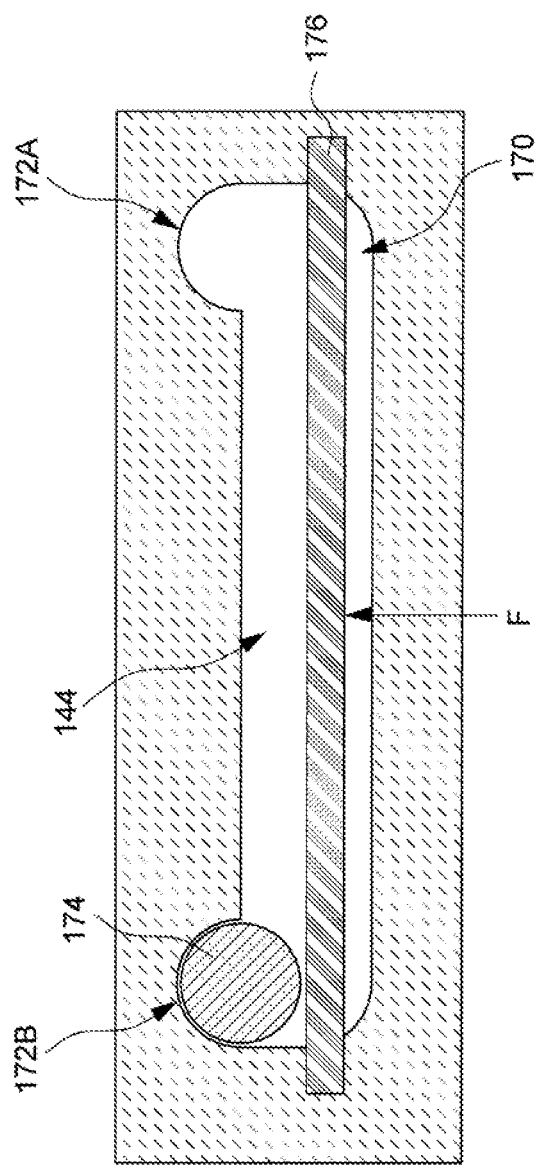
FIG. 14 is a cross-sectional view illustrating another embodiment of a fixture adapted to hold the crotch strap at multiple positions relative to the seat shell.

FIG. 14 is a schematic view illustrating another variant embodiment of a fixture 170 adapted to hold the intermediate portion 112C in place. Like previously described, each slot structure 144 can include a plurality of enlarged sections 172A and 172B with any of which a latch 174 can engage to lock the intermediate portion 112C of the crotch strap 112 in place. The latch 174 can be exemplary formed by an end portion of the rod 140.

In this embodiment, the fixture 170 can include a plate 176 mounted adjacent to the slot structure 144. The plate 176 can be movable vertically relative to the seat shell 102. A spring (not shown) may be connected with the plate 176, and configured to apply a spring force F that urges the latch 174 to engage with any of the enlarged sections 172A and 172B. When the crotch strap 112 is to be adjusted, the rod 140 can be displaced (e.g., downward) against the spring force F to push on the plate 176 and disengage the latch 174 from the engaged sections, e.g., the enlarged sections 172A. The released crotch strap 112 then can be adjusted, which drives the rod 140 to slide along the slot structures 144. Once the rod 140 is located in alignment with one set of enlarged sections, e.g., the enlarged sections 172B, the plate 176 can be biased upward by the spring force to urge the latches 174 to engage with the enlarged sections 172B of the slot structures 144. The intermediate portion 112C of the crotch strap 112 can be thereby locked at the desired position.

For holding the crotch strap 112 at any one of the desired positions, the aforementioned structures can apply a retaining action at the intermediate portion 112C, whereas the first end portion 112A of the crotch strap 112 is securely anchored with the seat shell 102. This fixed anchorage of one end portion of the crotch strap with the seat shell can result in stronger holding of the crotch strap during crash collision.

However, alternate constructions may also use the aforementioned structures of the fixtures to hold the crotch strap at its first end portion. For example, the first end portion 112A of the crotch strap 112 may be secured with the rod 140 that is movably guided along the slot structures 144. During adjustment, the first end portion 112A can move along with the rod 140.

Figure 15:
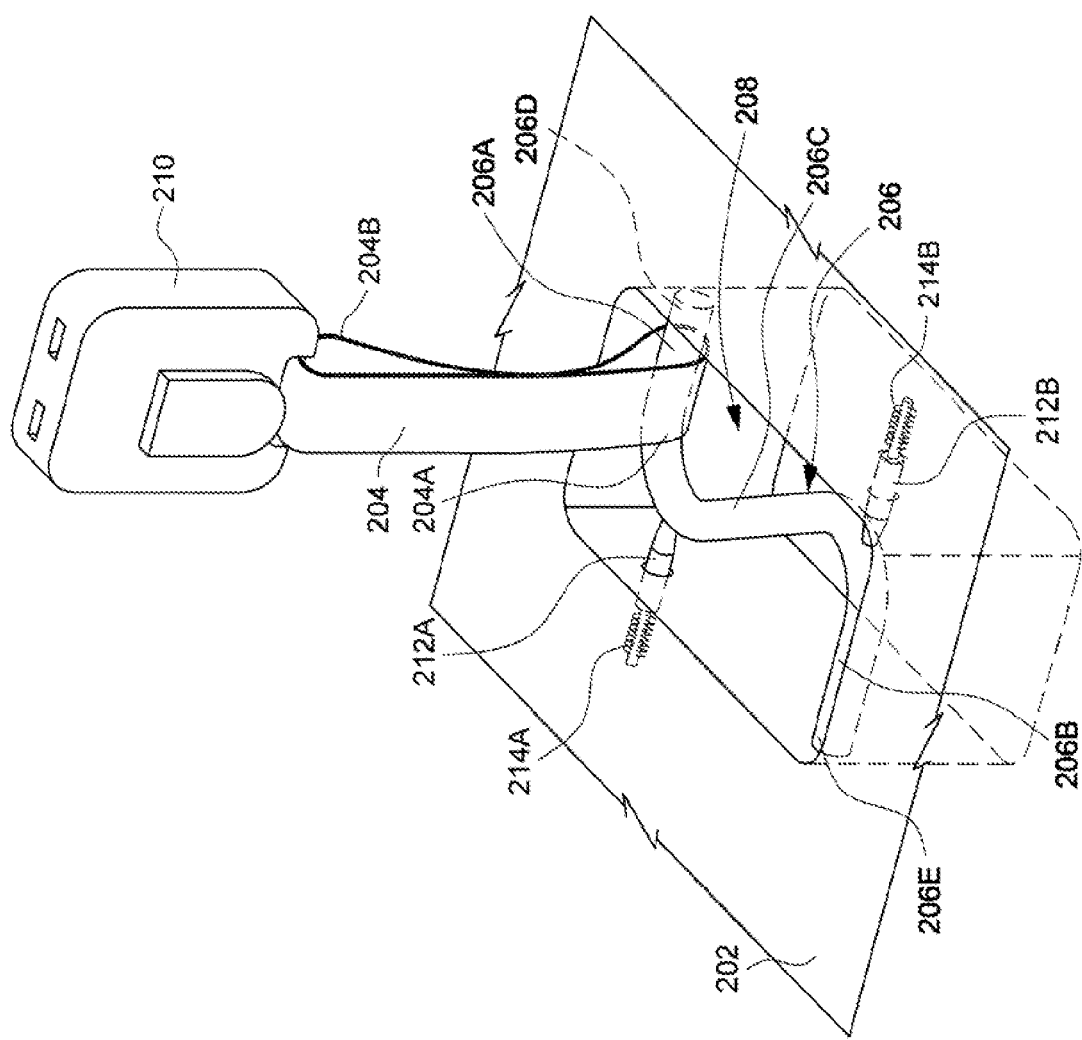
FIG. 15 is a schematic view illustrating another embodiment of assembling a crotch strap with a seat shell.
Figure 16:
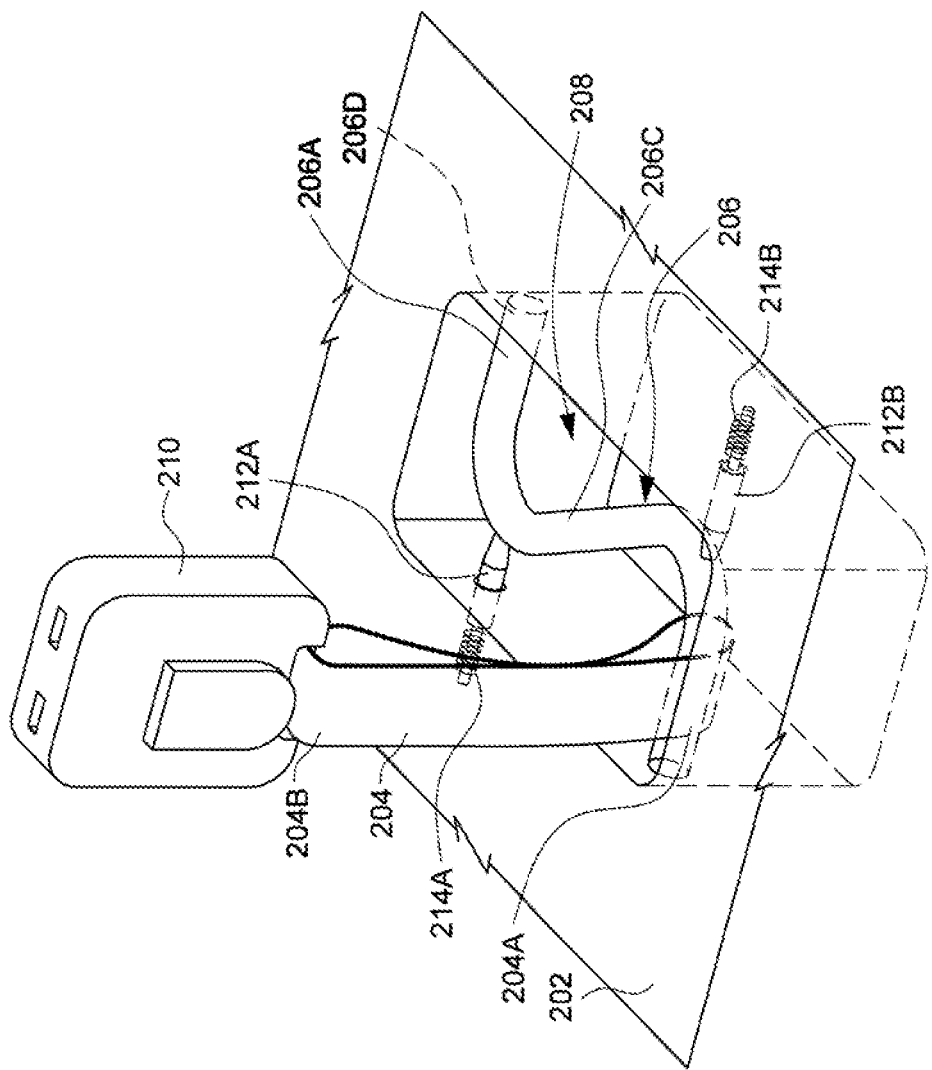
FIG. 16 is a schematic view illustrating the crotch strap of the embodiment shown in FIG. 15 adjusted to a desirable position.

FIGS. 15 and 16 are schematic view illustrating another embodiment of assembling a crotch strap 204 with a seat shell 202. In this embodiment, an anchor frame 206 can be affixed with the seat shell 202 adjacent to an opening 208 formed through an upper surface of the seat shell 202. The anchor frame 206 can be exemplary formed by a bent wire having a Z-shape, which can include a first and a second segment 206A and 206B parallel to each other, and a link segment 206C connected between the first and second segments 206A and 206B. Two opposite ends 206D and 206E of the anchor frame 206 can be respectively affixed with the seat shell 202. The first and second segments 206A and 206B can define two spaced-apart positions where the crotch strap 204 can be held in use.

The crotch strap 204 can include a first end portion 204A held with the anchor frame 206, and a second end portion 204B provided with a buckle 210. The first end portion 204A can form a loop wrapping around the anchor frame 206. For adjusting the crotch strap 204, the first end portion 204A can slide along the anchor frame 206 until it reaches any of the first and second segments 206A and 206B.

Stop members 212A and 212B can also be provided respectively adjacent to the joining regions between the link segment 206C and the first and second segments 206A and 206B. When the first end portion 204A is held at the first segment 206A (as shown in FIG. 15), the stop member 212A can be urged by a spring 214A to a locking state to block displacement of the first end portion 204A along the anchor frame 206. Unintended change from the position of the first segment 206A can be thereby prevented.

When the first end portion 204A is held at the second segment 206B (as shown in FIG. 16), the stop member 212B can be likewise urged by a spring 214B to a locking state to block displacement of the first end portion 204A along the anchor frame 206. Unintended change from the position of the second segment 206B can be thereby prevented.

At least one advantage of the embodiments described herein is the ability to provide a crotch strap that can be conveniently adjusted between multiple positions to accommodate children of different sizes. Accordingly, the child safety seats can be more flexible in use.

Realizations of the child safety seats have been described only in the context of particular embodiments. These embodiments are meant to be illustrative and not limiting. Many variations, modifications, additions, and improvements are possible. Accordingly, plural instances may be provided for components described herein as a single instance. Structures and functionality presented as discrete components in the exemplary configurations may be implemented as a combined structure or component. These and other variations, modifications, additions, and improvements may fall within the scope of the inventions as defined in the claims that follow.

What is claimed is:

1. A child safety seat comprising:
    a seat shell having an opening, the opening having a first and a second border region opposite to each other;
    a crotch strap having a first end portion, a second end portion, and an intermediate portion between the first and second end portions, the first end portion being anchored with the seat shell, the second end portion extending outward through the opening, and the intermediate portion being adjustable relative to the seat shell between a first and a second position spaced apart from each other; and
    a fixture operable to hold the intermediate portion of the crotch strap at any of the first and second positions, wherein the fixture includes a bracket that is connected with the seat shell and has a first and a second side edge;
    wherein the intermediate portion of the crotch strap is restrainedly held at the first position through a first slit that is delimited at least by the first border region of the opening and the first side edge of the bracket, and the intermediate portion of the crotch strap is restrainedly held at the second position through a second slit that is delimited at least by the second border region of the opening and the second side edge of the bracket.

2. The child safety seat according to claim 1, wherein the first end portion is pivotally mounted with the seat shell.

3. The child safety seat according to claim 2, wherein the first end portion forms a loop that wraps around a bar affixed with the seat shell.

4. The child safety seat according to claim 1, wherein the bracket is pivotally connected with the seat shell.

5. The child safety seat according to claim 1, wherein the bracket is movable between an unlocking position where the bracket uncovers the opening, and a locking position where the bracket at least partially covers the opening.

6. The child safety seat according to claim 1, further including a latch operable to lock the bracket in place so that the bracket prevents displacement of the intermediate portion between the first and second positions.

7. The child safety seat according to claim 6, wherein the latch is movably assembled with the bracket, and is biased by a spring in a direction for engaging with the seat shell.

8. The child safety seat according to claim 7, wherein the spring is formed integral with the latch.

9. A child safety seat comprising:
    a seat shell having an opening, the opening having a first and a second border region opposite to each other; and
    a crotch strap having a first end portion, a second end portion, and an intermediate portion between the first and second end portions, the first end portion being anchored with the seat shell, the second end portion extending freely outward through the opening, and the intermediate portion being adjustable relative to the seat shell between a first and a second position spaced apart from each other; and
    a bracket movably assembled with the seat shell and having a first and a second side edge opposite to each other, the bracket being operable to hold the intermediate portion of the crotch strap at any of the first and second positions;
    wherein the intermediate portion of the crotch strap is kept at the first position through a first slit that is delimited at least by the first border region of the opening and the first side edge of the bracket, and the intermediate portion of the crotch strap is kept at the second position through a second slit that is delimited at least by the second border region of the opening and the second side edge of the bracket.

10. The child safety seat according to claim 9, wherein the first end portion is pivotally mounted with the seat shell.

11. The child safety seat according to claim 9, wherein the bracket is movable between an unlocking position where the bracket uncovers the opening, and a locking position where the bracket covers the opening.

12. The child safety seat according to claim 9, further including a latch operable to lock the bracket in place so that the bracket prevents displacement of the intermediate portion between the first and second positions.

13. The child safety seat according to claim 12, wherein the latch is movably assembled with the bracket, and is biased by a spring in a direction for engaging with the seat shell.

14. The child safety seat according to claim 13, wherein the spring is formed integral with the latch.

15. The child safety seat according to claim 12, wherein the latch is engageable with an edge of the opening.

16. The child safety seat according to claim 9, wherein the bracket is movable between a closed position and an opened position, the bracket when in the closed position being interposed between the first and second border regions of the opening, and the bracket when in the opened position clearing a way for displacement of the intermediate portion across the opening from the first border region to the second border region.

17. The child safety seat according to claim 16, wherein the location where the first end portion is anchored with the seat shell is closer to the second border region than the first border region of the opening.

18. The child safety seat according to claim 16, wherein when the bracket is in the opened position, the intermediate portion is movable across the opening from the first border region past the bracket to the second border region.

19. The child safety seat according to claim 9, wherein the bracket is pivotally connected with the seat shell about a pivot axis that is substantially parallel to an axis of the opening extending from the first border region to the second border region.

\* \* \* \* \*